Aug. 24, 1937.                    W. J. COULTAS                    2,090,750
                                 PITMAN CONNECTION
                                Filed March 1, 1935
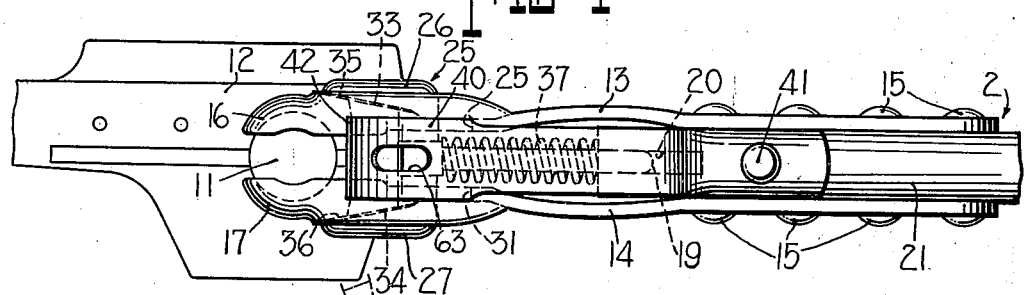
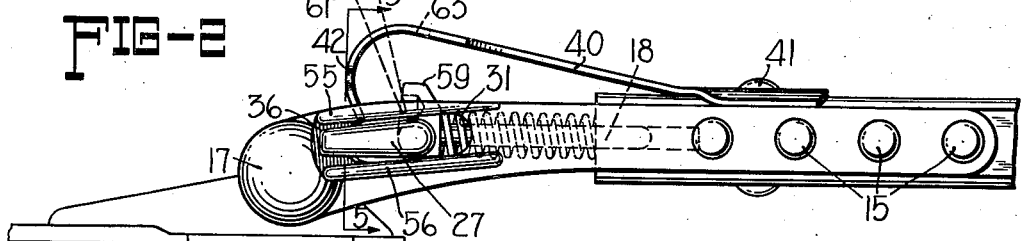
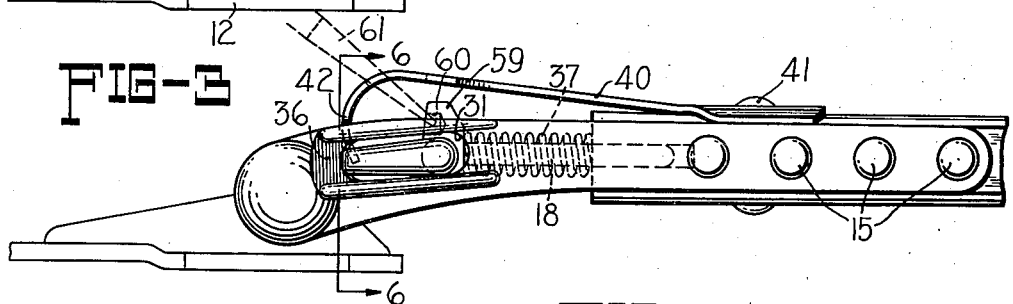
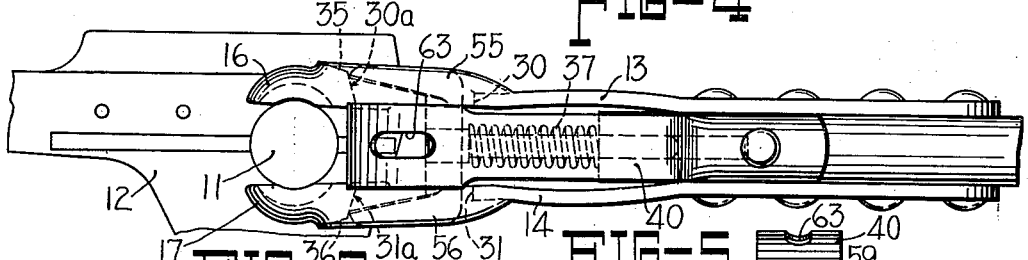
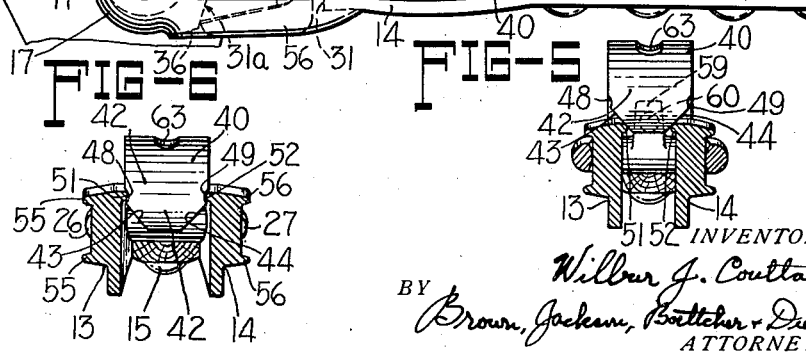

Patented Aug. 24, 1937

2,090,750

UNITED STATES PATENT OFFICE 2,090,750

PITMAN CONNECTION

Wilbur J. Coultas, Moline, Ill., assignor to Deere & Company, Moline, Ill., a corporation of Illinois Application March 1, 1935, Serial No. 8,824

15 Claims. (Cl. 287—89)

The present invention relates generally to pitman connections for mowers, harvesters and other agricultural machines.

The essential characteristics of a pitman connection of this type, in which the pitman is universally connected with the knife head of a cutting mechanism, are that the ball of the knife head be clamped between the straps of the pitman with a certain and definite pressure and that the clamping means be arranged to automatically compensate for wear on the knife head ball and the pitman straps. Another essential requirement is that suitable means be provided for forcibly separating the straps and holding them spread apart so as to make it convenient to remove the sickle from the pitman.

With these factors in mind, the principal object of the present invention is the provision of means for clamping the pitman jaws or straps together and entirely separate means for spreading the straps. By having these two entirely separate means, each can perform its own function and can be made more simple and sturdy.

More specifically an important object of the present invention is the provision of means carried by the pitman straps for clamping them together about the ball of the knife head and entirely separate means secured to the pitman for spreading or separating the straps. A further object of the present invention is the provision of suitable means whereby a simple tool, such as a screw driver, punch or the like, can be used in releasing the clamping means and operate the spreading means.

These and other objects and advantages of the present invention will be apparent to those skilled in the art after a consideration of the following detailed description, taken in conjunction with the accompanying drawing illustrating the preferred structural embodiment of the present invention.

Referring now to the drawing:

Figure 1 is a top plan view of a pitman constructed according to the principles of the present invention and showing the same clamped to the ball of the knife head of the cutting mechanism;

Figure 2 is a side view of the construction shown in Figure 1;

Figure 3 is a view similar to Figure 2 but showing the parts as they appear when the pitman straps have been separated to release the knife head;

Figure 4 is a top plan view of the parts when they are in the position indicated in Figure 3;

Figure 5 is a section taken along the line 5—5 of Figure 2; and

Figure 6 is a section taken along the line 6—6 of Figure 3.

Referring now to the drawing, the pitman is indicated in its entirety by the reference numeral 2 and is shown in Figure 1 as operatively connected to the ball 11 of a knife head 12 forming a part of the cutting mechanism operated by the pitman 2. The ball 11 as shown in Figure 1 is securely clamped between two resilient straps or jaws 13 and 14 which at their rear ends are secured, as by rivets 15, to one end of the pitman and at the other end are provided with generally spherical sockets 16 and 17 which receive the ball 11. The resilient straps or jaws 13 and 14 are yieldingly urged together by means of a plunger 18, the rear end 19 of which is disposed in a longitudinal bore 20 in the end of the pitman bar 21, usually formed of wood. At its forward end the plunger 19 is provided with a head 25 which includes a pair of fingers 26 and 27 which extend laterally outwardly through slots 30 and 31 in the pitman straps 13 and 14. The two fingers 26 and 27 are provided with inclined wedging or camming surfaces 33 and 34 on their inner sides, and these surfaces engage similar inclined wedging or camming surfaces 35 and 36 on the straps 13 and 14 just forward of the slots 30 and 31.

The plunger 18 is yieldingly urged outwardly of the pitman 2 to clamp the sockets 16 and 17 around the knife head ball 11 by means of a spring 37 which has its inner end received against the end of the pitman bar 21 and, at its outer end, bears against the head 25 to press the inclined wedging surfaces 33 and 34 against the similar inclined surfaces 35 and 36 on the straps to cam the socket portions 16 and 17 together. The inclination of the surfaces 33, 34, and 35, 36 is such that the straps are held securely clamped about the ball 11 without requiring too stiff a spring, which might otherwise make it difficult to spread the straps 13 and 14.

When it is necessary to remove the sickle bar of the cutting mechanism, the knife head 12 is disengaged by spreading the resilient straps or jaws 13 and 14 far enough to permit the detachment of the ball 11 from the sockets 16 and 17, as best shown in Figure 4. For the purpose of spreading the straps and holding them in a separated or spread position, means is provided which operates independently of the spring pressed plunger 19, such separate means preferably including a resilient member in the form of a spring strap 40 riveted or otherwise secured, as at 41, to the outer end of the pitman bar 21 by means entirely separate from the attaching means for the resilient straps 13 and 14. The strap 40 is provided with a curved end 42 directed generally transversely with respect to the longitudinal axis of the pitman 2, and the corners of the end 42 are cut away on a taper or incline, as indicated at 43 and 44, to provide camming or wedging surfaces. Adjacent the base sections of the camming surfaces 43 and 44 are notches 48 and 49 which cooperate with beads 51 and 52 formed on the inner edges on the resilient straps 13 and 14, as best shown in Figures 5 and 6.

For the purpose of serving as guideways for the finger portions 26 and 27 on the wedge member 25, the sides of the resilient straps 13 and 14 are provided with pairs of flanges 55 and 56, and the clamping member 25 is provided with an upwardly disposed lug 59 having a recess 60 formed therein to receive a tool, indicated by the reference numeral 61, such as a prick punch, screw driver or the like. By using such a tool and applying force against the lug 59, the spring 37 may be compressed to permit the clamping portions 26 and 27 to be moved out of engagement with the inclined surfaces 35 and 36 on the straps 13 and 14, the member 25 moving rearwardly in the slots 30 and 31.

To facilitate the insertion of a tool, such as 61, the spring strap 40 is provided with a slot 63, and the slot may be used in the manner indicated in Figures 2 and 3 to forcibly separate the straps 13 and 14. The tool 61 is placed through the slot 63 and into the recess 60, and when the tool, with its end in the recess 60, is forced downwardly, to the left as viewed in Figures 2 and 3, the tool bears against the outer end of the slot 63 and at the same time exerts a force sufficient to move the clamping member 25 inwardly of the slots 31 and against the tension of the spring 37. As soon as the outermost ends of the inclined sections 26 and 27 clear the surfaces 35 and 36, the pressure of the tool downwardly against the tapered end of the spring strap 40 is sufficient to force the tapered end thereof in between the straps, separating them until the notches 48 and 49 engage the beads 51 and 52, as shown in Figure 6. When this engagement is effected, the strap 40 then serves as means for holding the resilient jaws 13 and 14 separated or spread apart sufficient to permit the disengagement of the ball 11 from the sockets 16 and 17.

As soon as this has been accomplished, the tool may be withdrawn, for the tips of the clamping fingers 26 and 27 are disposed to the rear of the camming surfaces 35 and 36 and bear against the front ends 30a and 31a of the slots 30 and 31 in the resilient straps 13 and 14. These front walls 30a and 31a of the slots incline only slightly, as best shown in Figure 4, so that the force of the spring 37 urging the member 25 forwardly will have no appreciable tendency toward forcing the straps 13 and 14 together when they are held separated by the spring member 40. Thus, while I have provided entirely separate and distinct means for forcing the resilient jaws together and for separating them, neither of such independent means interferes with the proper functioning of the other.

To reconnect the pitman to the knife head, it is merely necessary to place the straps 13 and 14 over the knife head ball, and then with any convenient tool, such as the tool 61, placed in the space between the strap 40 and the top of one or the other of the resilient members 13 and 14, the spring strap 40 may be pried upwardly sufficiently to disengage the recesses 48 and 49 from the beads 51 and 52. Thereupon the spring 37 will act to force the wedging member 25 forwardly and to securely clamp the straps 13 and 14 and their sockets 16 and 17 upon the ball 11, at the same time forcing the spring strap 40 upwardly into the position shown in Figure 2.

While I have shown and described above the preferred structure in which the principles of the present invention have been embodied, it is to be understood that my invention is not to be limited to the specific details shown and described above, but that, in fact, widely different means may be employed in the practice of the broader aspects of my invention.

What I claim, therefore, and desire to secure by Letters Patent is:

1. In a pitman connection, a pitman having resilient straps, clamping means carried by said straps for forcing the straps toward one another, and means carried by said pitman separately from said clamping means and movable independently of the latter for spreading said straps.

2. In a pitman connection, a pitman having resilient straps, clamping means acting longitudinally of the pitman for moving the straps toward one another, and means carried by said pitman separately from said straps and acting transversely of the longitudinal axis of the pitman for spreading said straps and for locking the latter in spread apart relation independently of the position of said clamping means.

3. In a pitman connection, a pitman having resilient straps, longitudinally movable means carried by said straps for wedging the latter toward one another, spring means reacting against the end of the pitman and said wedging means for forcing the straps together, said wedging means being retractible against the tension of said spring means, and means separate therefrom and carried by said pitman independently of said resilient straps for spreading the latter after said wedging means has been retracted.

4. In a pitman connection, a pitman having resilient straps, a shiftable member reacting against said straps for clamping them in closed position, resilient means for actuating said shiftable member, a second member movable independently of said shiftable member and having means reacting against said straps for spreading the latter, and means carried by both of said members to provide for the reception of a tool reacting against said second member for retracting said shiftable member to permit said spreading member to open said straps.

5. In a pitman connection, a pitman having resilient straps, both movable with respect to said pitman and said straps being biased for movement toward one another, there being aligned slots in the straps, a longitudinally reciprocable clamping member mounted in said slots for movement toward and away from the ends of said straps, said member having laterally disposed inclined portions and each of said straps having a camming surface adjacent the slot therein, the inclined portions of said member cooperating with said camming surfaces for wedging the straps toward one another, spring means for forcing said member to clamp said straps together, means for spreading said resilient straps against the bias of the latter, and tool receiving means carried by said member and by said spreading means and providing for retracting said member and simultaneously forcing said spreading means in between said straps to separate the latter, the inclined portions on said member leaving said surfaces and entering said slots so as to be in a position to react against the ends of the latter for holding the clamping means in retracted position.

6. In a pitman connection, a pitman having resilient clamping jaws, and means for separating said jaws comprising a spring member separately secured to said pitman and biased for movement outwardly of said clamping jaws, said spring member having a tapered end disposed generally transversely of the clamping jaws and adapted to be forced between said jaws to spread the latter.

7. In a pitman connection, a pitman having clamping jaws, one of which is resilient, and means for separating said jaws comprising a spring member connected with said pitman and having a tapered portion adapted when said spring member is forced in between said jaws to engage the resilient jaw to move the same away from the other jaw, said inclined portion having a notch therein to receive the resilient jaw when said jaws have been separated for the purpose of holding said jaws in separated relation.

8. In a pitman connection, a pitman having resilient straps, a shiftable member reacting against said straps for clamping them in closed position, resilient means for actuating said shiftable member, means carried by the latter to provide for the reception of a tool for retracting said shiftable member to permit said straps to open, and means for separating said straps comprising a member movably connected with said pitman and having a tapered end adapted to be forced in between said straps, said last named member having an opening therein to provide for the insertion of a tool in said tool receiving means.

9. In a pitman connection, a pitman having resilient straps, a shiftable member reacting against said straps for clamping them in closed position, resilient means for actuating said shiftable member, means carried by the latter to provide for the reception of a tool for retracting said shiftable member to permit said straps to open, and means for separating said straps including a spring member secured to the pitman and having an end turned transversely with respect to the longitudinal axis thereof and tapered, whereby when said spring member is forced in between said straps the latter are spread apart, said spring member having an opening therein adjacent said tool receiving means to provide for the insertion of a tool in the latter for simultaneously retracting said shiftable member and forcing said spring member in between said straps.

10. In a pitman connection, a pitman having resilient clamping jaws biased for movement toward each other, and means for separating said jaws comprising a member movably connected with said pitman and having a tapered portion adapted when said member is forced in between said jaws to engage and separate the jaws, there being notches formed in said member to receive the edges of the jaws after they have been separated by said member for the purpose of holding said jaws in separated relation.

11. In a pitman connection, a pitman having resilient straps, and means for separating said straps including a spring member secured to the pitman and having an end turned transversely with respect to the longitudinal axis thereof and tapered, whereby when said spring member is forced in between said straps the latter are spread apart, said spring member having an opening therein to provide for the insertion of a tool for forcing said spring member in between said straps.

12. In a pitman connection, a pitman having a body and a pair of resilient straps, clamping means carried by said straps, and spreading means separate from said clamping means and carried by said body.

13. In a pitman connection, a pitman having resilient clamping jaws, means for separating said jaws comprising a spring member biased for movement outwardly of said jaws and having a tapered end adapted to be forced between said jaws, and cooperating means on said jaws and spring member, providing for the reception of a tool or the like to force the tapered end of said spring member in between said jaws.

14. In a pitman connection, a pitman having resilient clamping jaws, means for separating said jaws comprising a spring member having a tapered end adapted to be forced between said jaws, and cooperating means on said jaws and said spring member for retaining the latter in a position to hold the clamping jaws separated.

15. In a pitman connection, a pitman having resilient clamping jaws, and means for separating said jaws comprising a spring member having a tapered end adapted to be forced between said jaws, there being notches on said spring member adjacent the tapered end thereof cooperating with said clamping jaws for holding the spring member in between the latter.

WILBUR J. COULTAS.